United States Patent
Hyun et al.

(10) Patent No.: US 8,064,820 B2
(45) Date of Patent: Nov. 22, 2011

(54) METHOD AND SYSTEM FOR SERVICE ANNOUNCEMENT USING MBMS MULTICAST BEARER

(75) Inventors: Eun-hee Hyun, Daejon (KR);
Cheol-Hye Cho, Daejon (KR);
Young-Jick Bahg, Daejon (KR)

(73) Assignees: Electronics and Telecommunications Research Institute, Daejon (KR);
Samsung Electronics Co., Ltd., Suwon-Si, Gyeonggi-Do (KR)

( * ) Notice: Subject to any disclaimer, the term of this patent is extended or adjusted under 35 U.S.C. 154(b) by 477 days.

(21) Appl. No.: 12/441,626

(22) PCT Filed: Sep. 12, 2007

(86) PCT No.: PCT/KR2007/004414
§ 371 (c)(1),
(2), (4) Date: Mar. 17, 2009

(87) PCT Pub. No.: WO2008/035880
PCT Pub. Date: Mar. 27, 2008

(65) Prior Publication Data
US 2009/0264064 A1  Oct. 22, 2009

(30) Foreign Application Priority Data
Sep. 18, 2006 (KR) .................. 10-2006-0090159

(51) Int. Cl.
*H04H 20/71* (2008.01)
(52) U.S. Cl. ....... 455/3.01; 455/466; 455/403; 455/517; 455/524; 370/331; 370/335; 370/469; 370/450; 370/468
(58) Field of Classification Search ............. 455/3.01, 455/3.02, 3.03, 3.04, 452, 403, 515, 517, 455/524, 466; 370/331, 335, 347, 469, 450, 370/468
See application file for complete search history.

(56) References Cited

U.S. PATENT DOCUMENTS

| | | | |
|---|---|---|---|
| 6,684,081 B2 * | 1/2004 | Sarkkinen et al. | 455/515 |
| 6,839,565 B2 | 1/2005 | Sarkkinen et al. | |
| 7,039,030 B2 * | 5/2006 | Terry | 370/335 |
| 7,450,899 B2 * | 11/2008 | Roberts et al. | 455/3.01 |
| 7,586,874 B2 * | 9/2009 | Rudolf et al. | 370/330 |
| 7,869,758 B2 * | 1/2011 | Park | 455/3.01 |
| 7,970,002 B2 * | 6/2011 | Hu | 370/432 |
| 2004/0192267 A1 | 9/2004 | Kettunen et al. | |
| 2006/0107287 A1 | 5/2006 | Lee et al. | |

(Continued)

FOREIGN PATENT DOCUMENTS

JP   2002-368751   12/2002

(Continued)

*Primary Examiner* — Linh Nguyen
(74) *Attorney, Agent, or Firm* — Nelson Mullins Riley & Scarborough LLP; EuiHoon Lee, Esq.

(57) ABSTRACT

There is provided a method for a multimedia broadcast/multicast service (MBMS) announcement to provide a service announcement document in a broadcast multicast service center (BM-SC) of a MBMS system, including the steps of: generating a service announcement document; searching a service announcement area; setting a session for providing the service announcement document to the searched service area by setting a MBMS multicast bearer; transmitting a corresponding service announcement document to the service announcement area, wherein the service announcement document includes an announcement area directories according to service announcement areas, and the announcement area directory includes service directories according to services provided to corresponding service announcement areas as a lower directory.

24 Claims, 5 Drawing Sheets

U.S. PATENT DOCUMENTS

| | | | |
|---|---|---|---|
| 2009/0291631 A1* | 11/2009 | Xue et al. | 455/3.01 |
| 2010/0010975 A1* | 1/2010 | Morris | 707/4 |
| 2010/0142401 A1* | 6/2010 | Morris | 370/254 |
| 2011/0116433 A1* | 5/2011 | Dorenbosch | 370/312 |
| 2011/0149827 A1* | 6/2011 | Na et al. | 370/312 |

FOREIGN PATENT DOCUMENTS

| | | |
|---|---|---|
| JP | 2005-117655 | 4/2005 |
| KR | 1020030089779 | 11/2003 |
| KR | 1020040016334 | 2/2004 |
| KR | 1020050017580 | 2/2005 |
| KR | 1020060015194 | 2/2006 |
| KR | 1020060104137 | 10/2006 |
| WO | WO-2004/008688 A1 | 1/2004 |
| WO | WO-2004/017579 A1 | 2/2004 |
| WO | WO-2004/056096 A1 | 7/2004 |

* cited by examiner

METHOD AND SYSTEM FOR SERVICE ANNOUNCEMENT USING MBMS MULTICAST BEARER

RELATED APPLICATIONS

This application is a 35 U.S.C. 371 national stage filing of International Application No. PCT/KR2007/004414 filed on Sep. 12, 2007, which claims priority to, and the benefit of, Korean Patent Application No. 10-2006-0090159 filed on Sep. 18, 2006. The contents of the aforementioned applications are hereby incorporated by reference.

TECHNICAL FIELD

The present invention relates to a method and system for service announcement using a MBMS multicast bearer; and, more particularly, to a method and system for service announcement according to a service area using a multicast bearer in order to provide MBMS in a mobile communication network.

This work was partly supported by the Information Technology (IT) research and development program of the Korean Ministry of Information and Communication (MIC) and/or the Korean Institute for Information Technology Advancement (IITA) [2005-S-404-22, "Research and development on 3G long-term evolution access system"] and the National Research Laboratory (NRL) program of the Korean Ministry of Science and Technology (MOST)/the Korea Science and Engineering Foundation (KOSEF) [2005-S-404-22, "Research and development on 3G long-term evolution access system"].

BACKGROUND ART

A multimedia broadcast/multicast service (MBMS) transmits a multimedia contents packet obtained from a data source such as a contents provider (CP) or a multicast broadcast (MB) source server to a plurality of user equipments through a mobile communication network using a broadcasting scheme or a multicasting scheme.

In more detail, the contents providers interact with a broadcast and multicast service center (BM-SC) for managing and controlling MBMS. The BM-SC interacts with a gateway general packet radio service (GPRS) supporting node (GGSN) in order to transmit multimedia contents through a mobile communication network.

Since such a point-to-multipoint service transmits MBMS contents from a CP or a MB source server at once using a broadcast channel or a multicast channel which is shared by a plurality of user equipments, mobile communication network resources can be saved.

The MBMS is mainly used in the wireless communication network systems of a wideband code division multiple access (WCDMA) network and a European mobile phone, for example a GSM equipment. The MBMS simultaneously transmits contents to a plurality of equipments using a packet core network for providing a typical packet service with a BM-SC as a center and a bearer provided from a UMTS terrestrial radio access network (UTRAN). Herein, the BM-SC is a network element defined to manage the MBMS.

In order to provide a MBMS in a mobile communication network, a user equipment must have information about available services according to corresponding service areas. The BM-SC must perform service announcement to user equipments to enable the user equipments to receive information about a list of available multicast services and related services. The user equipments set an environment and provide the list of available services to a user using the received information, thereby allowing a user to select a desired MBMS.

In the mobile communication environment, the service announcement can be performed using a MBMS broadcast bearer or a MBMS multicast bearer. Also, the service announcement can be performed using service frame works provided from a mobile communication network such as a multimedia messaging service (MMS), a short message service (SMS), a call broadcast service (CBS), and a wireless application protocol (WAP). Furthermore, the service announcement may be performed using a service method used for transmitting a document between a web service and a client browser in a wired Internet network.

However, the above conventional methods excepting CBS use a unicast mode communication scheme. It is very ineffective to use a unicast channel to obtain service information in an environment where all of equipments must receive identical information in a corresponding area.

Therefore, it is reasonable to use a MBMS bearer to enable equipments to receive same information at the same time with one time data transmission.

Meanwhile, when a broadcast bearer is used, a MB-SC transfers service information to a mobile communication network using a broadcast mode. Since the mobile communication network transfers the service information to all of equipments through a broadcast channel available to all areas, all of equipments receive the same information.

Therefore, a user equipment receives all of service information including information about services not available at corresponding area. Then, the user equipment summarizes the received information only with available services at the corresponding area and provided the summarized information to a user. Since such a service announcement procedure is performed regularly, unnecessary information is regularly transmitted to the user equipment through a wireless resource, thereby wasting wireless resources.

That is, since the service announcement regularly transmit service information, the limited wireless resources are wasted to transfer information about services not available at a corresponding area. It may degrade the quality of a real MBMS. Therefore, it is preferable to reduce the amount of data transmitted through a wireless region by transmitting information of available services only according to a corresponding service area, thereby enabling a user equipment to use the announced information without additional processing.

The MBMS service announcement transfers different service lists and service information about contents transferred by a corresponding service according to a service area. However, if a broadcast bearer is used, all of equipments receive service information through only one broadcast channel although the equipments are located at different areas. Therefore, the BM-SC must use a corresponding broadcast channel to transmit information about the MBMS lists and contents transferred by each service. It requires an equipment to perform an additional process such as selecting services available at own area, and unnecessary information is transferred through a wireless resources.

In order to overcome the problems of the conventional method using the broadcast bearer, there is a demand for a service announcement method for selectively announcing services available according to a service area if services received according to geometrical areas are different.

Meanwhile, a MBMS multicast channel for service announcement is allocated to each of unit areas, and a BM-SC manages information to be provided to an equipment through service announcement according to unit areas, thereby providing only corresponding information to related areas. Such a procedure requires a MBMS multicast bearer setting step for service announcement. This procedure occurs when an equipment receives an Internet group management protocol (IGMP) or a multicast listener discovery (MLD) for IPv6 to register to a MBMS multicast service group.

However, since the service announcement must be always available regardless of the intention of equipment to receive service announcement, an IGMP or a MLD cannot be expected from the user equipment.

DISCLOSURE OF INVENTION

Technical Problem

An embodiment of the present invention is directed to providing a method and service for service announcement according to a service area using a MBMS multicast bearer.

Another embodiment of the present invention is directed to providing a method and system for service announcement according to a service area using a MBMS multicast bearer without the participation of an equipment.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for a multimedia broadcast/multicast service (MBMS) announcement to provide a service announcement document in a broadcast multicast service center (BM-SC) of a MBMS system, including the steps of: generating a service announcement document; searching a service announcement area; setting a session for providing the service announcement document to the searched service area by setting a MBMS multicast bearer; transmitting a corresponding service announcement document to the service announcement area, wherein the service announcement document includes an announcement area directories according to service announcement areas, and the announcement area directory includes service directories according to services provided to corresponding service announcement areas as a lower directory.

In accordance with another aspect of the present invention, there is provided a method for multimedia broadcast/multicast service (MBMS) announcement in order to provide service announcement document in a universal mobile telecommunications network terrestrial radio access network (UTRAN) of a MBMS system, including the steps of: managing IP session information for a MBMS announcement; transmitting a virtual Internet group management protocol (IGMP) or a virtual multicast listener discovery (MLD) for a multicast service of a service announcement area for a MBMS; setting a MBMS bearer for transferring service announcement document to the service announcement area; setting a radio multicast channel for a cell corresponding to the service announcement area; and transmitting the service announcement document received from a BM-SC to user equipments in the cell with the radio multicast channel set, wherein the service announcement document includes an announcement area directory according to a service announcement area, and the announcement area directory includes a service directory according to a service provided to a corresponding announcement area as a lower directory.

In accordance with another aspect of the present invention, there is provided a system for multimedia broadcast/multicast service (MBMS) service announcement using a MBMS multicast bearer including: a broadcast multimedia service control node (BM-SC); and a radio access network control node, wherein the BM-SC includes: a means for generating a service announcement document including announcement area directories according to service announcement areas and service directories according to services to be provided to a corresponding service area as a lower directory of the announcement area directories and managing the generated service announcement document, and wherein the radio access network control node includes: a mean for transferring the service announcement document to the user equipment located at the service announcement area.

Advantageous Effects

A method and system for service announcement according an embodiment of the present invention can announce services according to a service area using a MBMS multicast bearer.

Also, the method and system for service announcement according an embodiment of the present invention can announce services to a service area without the participation of user equipment.

Furthermore, the method and system for service announcement according an embodiment of the present invention can announce only available MBMS to a corresponding service using a scheme of processing a MBMS multicast service in a MBMS frame work. Accordingly, radio resources can be saved by removing unnecessary information to transmit, and supplementary processes for selecting available services from a received service announcement document can be simplified.

BEST MODE FOR CARRYING OUT THE INVENTION

The advantages, features and aspects of the invention will become apparent from the following description of the embodiments with reference to the accompanying drawings, which is set forth hereinafter.

In a method and system for service announcement according to an embodiment of the present invention, one MBMS multicast channel for service announcement is allocated to a corresponding unit area for service announcement, and a BM-SC manages information, which is transmitted to equipments through service announcement, by a unit area in order to transfer only related information to a corresponding announcement area.

In order to allocate and manage, it is required to set a MBMS multicast bearer for service announcement. Such an operation is generally performed when an equipment transmits an IGMP or a MLD for IPv6 to a target MBMS multicast service group. However, since the service announcement must be always available regardless of the intention of equipment to receive service announcement, an IGMP or a MLD cannot be expected from a user equipment. In order to overcome such a problem, a UTRAN includes functions of transmitting an Internet group management protocol (IGMP) or a multicast listener discovery (MLD) message to perform service announcement without the participation of a user equipment for setting a multicast bearer like a general MBMS multicast service in the present invention. That is, a user equipment, a UTRAN, a core network, and a BM-SC are enabled to use a process of multicast bearer as it is according to the present invention.

Figure 1:
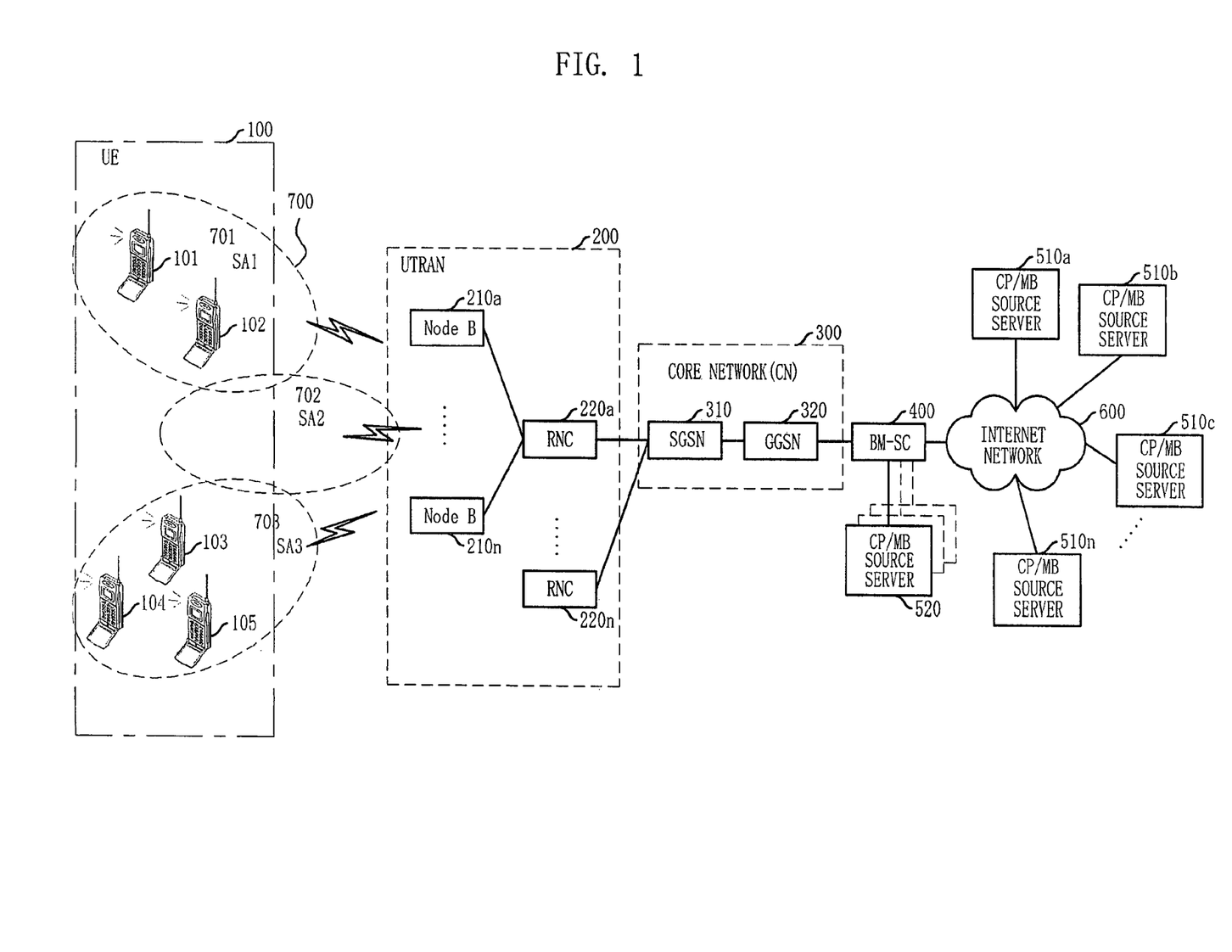
FIG. 1 is a diagram illustrating a 3GPP based MBMS system where the present invention is applied.

FIG. 1 is a diagram illustrating a 3GPP based MBMS system where the present invention is applied.

A MBMS is provided according to an area, and the area provided with a MBMS is referred as a service area (SA) for a corresponding MBMS.

The SA may have various sizes such as a cell unit area, a node unit area, a RNC unit area, a SGSN support node unit area, and a GGSN unit area. Herein, RNC stands for radio network controller, SGSN stands for servicing general packet radio service support node, and GGSN stands for gateway general packet radio service support node. Also, one SA may overlap with other service areas.

Referring to FIG. 1, in case of a multicast service, each of the service areas 701 to 703 may provide different MBMSs, and user equipments UE 101 and 102 in a corresponding service area 701 and registered to receive a MBMS are allowed to receive a corresponding MBMS.

In case of a broadcast service, all of user equipments located at a corresponding service area (SA) is allowed to receive services. But, the user equipments 101 to 105 in a corresponding service area SA must be assigned to receive a broadcast channel.

As shown in FIG. 1, the MBMS system includes a user equipment UE 100, a universal mobile telecommunications network terrestrial radio access network (UTRAN) 200, a core network (CN) 300, a broadcast multicast service center (BM-SC) 400, and content provider/multicast broadcast (CP/MB) source servers 510A to 510N, and 520.

The UTRAN 200 includes a plurality of nodes B 210A to 210N for managing a plurality of user equipments UE 100 for receiving broadcast multimedia contents packets, and a plurality of radio network controllers (RNC) 230A to 230N.

The core network (CN) 300 includes a plurality of serving GPRS support nodes (SGSN) 310 and a gateway GPRS support nodes (GGSN) 320 for providing a packet service.

The BM-SC 400 controls and manages a multimedia broadcast multicast service (MBMS) provided to a plurality of user equipments 101 to 105 in order to broadcast or multicast contents by interacting with the GGSN 320. A plurality of the user equipments UE 101 to 105 are joined to a multicast session that is registered to the MBMS through a distribution tree formed of lower nodes of the GGSN 320.

The CP/MB source servers 510A to 510N and 520 are connected to the BM-SC 400 or the Internet network 600 and provide multimedia contents for the MBMSs. That is, the CP/MB source servers 510A to 510N and 520 provides the broadcast multicast service contents of an inner content provider (CP) or the broadcast multicast service contents of an external content provider (CP) connected to the Internet network according to a broadcast schedule per a corresponding MBMS.

The nodes B 210A to 210N receives uplink signals transmitted from a plurality of user equipments 101 to 105 at a physical layer, and transmit downlink signals to the user equipment UE 100. That is, the nodes B 210A to 210N transmit and receive signals to/from the UE 100 and operate as an access point to connect the user equipment 100 to the UTRAN 200. Also, the nodes B 210A to 210N communicate with the user equipment 100 in a corresponding cell through a wireless channel by managing radio resources in a cell unit.

The RNCs 220A to 220N allocate and manage radio resources for a plurality of the nodes B 210A to 210N. The RNCs 220A to 220N also operate as an access point to connect the nodes B 210A to 210N to the core network CN 300.

The RNCs 220A to 220N are connected to the SGSN 310 of the CN 300.

The SGSN 310 manages the mobility of the UE 100 by being connected to the GGSN 320 and selectively transmits data for MBMS related service to a predetermined RNC 220.

The GGSN 320 operates as a gateway to interact with the Internet or the external packet network. The GGSN 320 is connected to an external Internet network 600 through the BM-SC 400.

The BM-SC 400 is a node for MBMS control. The BM-SC 400 is a necessary element because it is one of functional elements of a W-CDMA system for providing MBMSs. The BM-SC 400 is the core for managing and controlling the MBMSs. The BM-SC 400 transfers information about the preparation of receiving services and service information to MBMS user equipments.

The BM-SC 400 provides functions of managing MBMS subscribers, managing service information, applying MBMS bearer service, starting services, scheduling the transmission of MBMS information and transferring the MBMS information in a mobile communication network. Also, the BM-SC 400 provides a service announcement service to transfer available service types according to a corresponding area, characteristics of contents to be received from a corresponding service, and parameters necessary for communication.

The BM-SC 400 is connected to the GGSN 320, an access point of a packet transfer network of a W-CDMA network, in order to provide a MBMS to user equipments 101 to 105. An IP interface used to connect the GGSN 320 to the external Internet network 600 is used as the interface between the BM-SC 400 and the GGSN 320.

The BM-SC 400 operates as an entry point for the CP/MB source servers 510A to 510N and 520 to transfer MBMS information. Also, the BM-SC 400 may operate as a contents provider CP.

The contents provider CP denotes a node having an application function for transferring contents. The multicast broadcast source server is similar to a storage device for simply storing contents or a file transfer protocol (FTP) server.

The CP/MB source servers 510A to 501N and 520 provides broadcasting contents to be transmitted to a plurality of user equipments according to a MBMS application provided from the BM-SC 400 or other contents providers CP. The CP/MB 510A to 510N and 520 communicate through the Internet network 600 like a node.

The user equipment 100 provides a list of available services and detail information to a user using service announcement document received from the BM-SC 400. The user is allowed to select a desired MBMS using the provided information. After the user select one of the MBMSs, the UE 100 performs an operation for registering a multicast group to the BM-SC 400 for a corresponding service.

The UE 100 registers a request to receive a corresponding MBMS to the BM-SC 400. Then, the UE 100 receives corresponding MBMS contents from the BM-SC 400 at the time of starting the corresponding MBMS.

The BM-SC 400 transfers MBMS contents from the CP/MB 520 and 510A to 510N to a plurality of user equipments 101 and 102 in a corresponding service area (SA) 701 according to MBMS control through a common channel used in a corresponding service area SA1 after passing through the GGSN 320, the SGSN 310, the RNCs 230A to 230N, and the nodes B 210A to 210N.

The BM-SC 400 transfers corresponding contents to all of GGSNs 320 that supports the user equipments 101 and 102 to receive a corresponding MBMS.

The GGSN 320 transfers corresponding contents to a plurality of SGSNs 310 that supports a plurality of user equipments 101 and 102 in a corresponding service area SA1 701.

The SGSN 310 transmits corresponding contents to a plurality of RNCs 220A to 220N and a corresponding RNC 220A transfers the received contents to a plurality of nodes B 210A to 210N.

Finally, the nodes B 210A to 210N transmit contents to the user equipments 101 and 102 through a common channel used in a corresponding service area SA1 701.

As described above, the MBMS is a broadcasting multicast service that provides contents from the CP/MB source servers 520 and 510A to 510N to authenticated user equipments 101 and 102 according to a broadcasting schedule of a corresponding service through a distribution tree formed of links of lower nodes in response to the control of the BM-SC 400.

Figure 2:
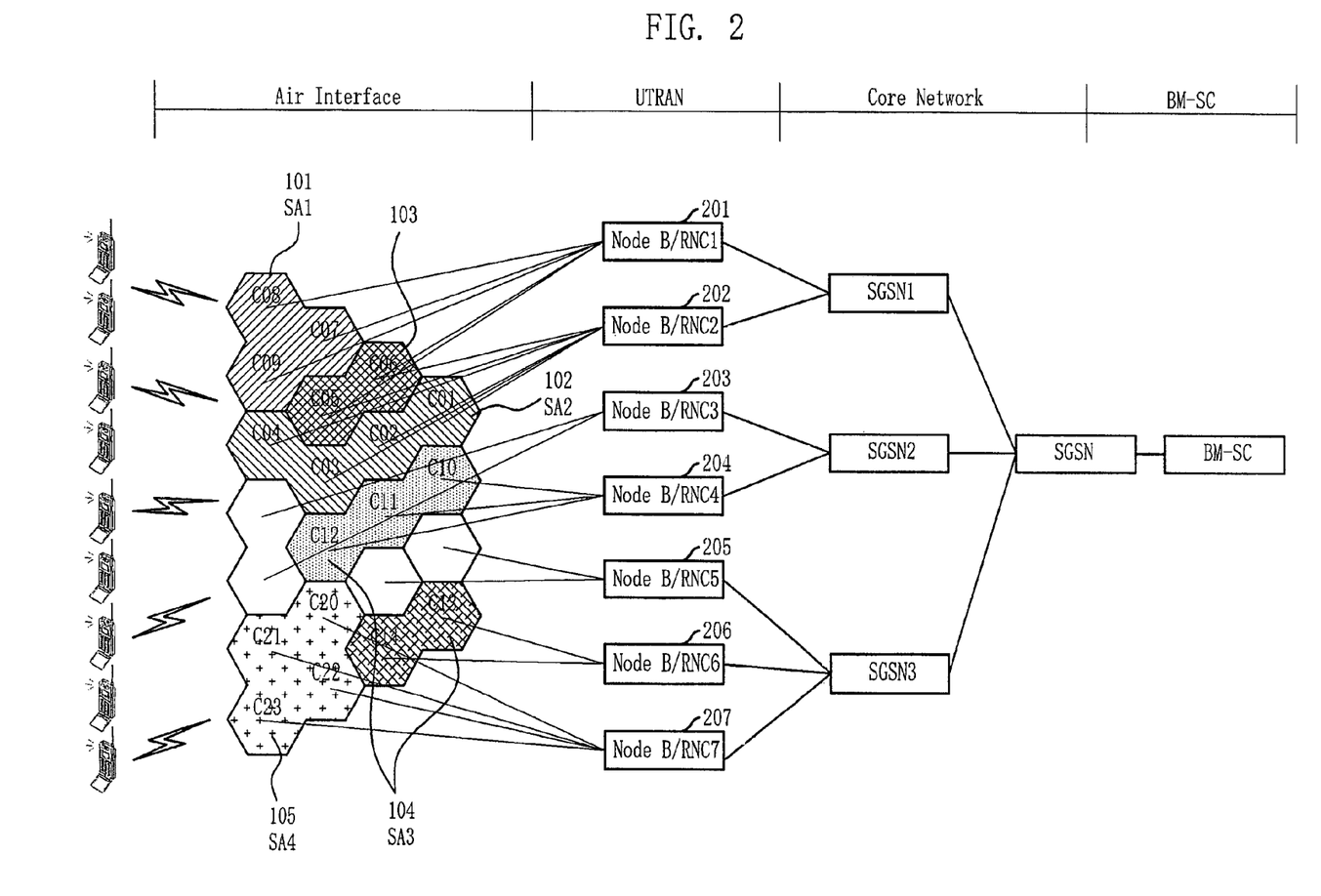
FIG. 2 is a diagram depicting a MBMS multicast service area, service announcement area, and multicast service allocation.

FIG. 2 is a diagram depicting a MBMS multicast service area, service announcement area, and multicast service allocation.

A function for service announcement using a MBMS bearer follows a MBMS download type service processing procedure. The 3GPP standard advises to use a file delivery over unidirectional transport (FLUTE) protocol introduced from the internet engineering task force (IETF) and performs contents download by operating a FLUTE client and a server in the user equipment and the BM-SC.

That is, the service announcement is treated as one MBMS, and an IP multicast address and ports are allocated to be used in a FLUTE session.

Such system information is shared with the BM-SC and user equipments. The user equipment may previously store the system information or may variably receive the system information through the UTRAN.

The BM-SC, the CN, and the UTRAN set a MBMS bearer for service announcement using the defined information. The BM-SC transfers a service announcement document to a user equipment in a form of data. Encoding and decoding rules of the transferred data follow a predetermined protocol agreed between the user equipment and the BM-SC.

The MBMS area means an area where a corresponding MBMS is transferred to. The MBMS area includes a MBMS multicast service area and a MBMS broadcast service. The minimum unit of the MBMS area is a cell. That is, the service area is a set of cells where a predetermined MBMS is transferred to. Under such a definition, service announcement for a corresponding service is performed on each of service areas.

Meanwhile, an area may be belonged to multiple service areas for providing different services in an environment provided with a plurality of MBMSs.

Referring to FIG. 2, a first service area 101 includes five cells C05, C06, C07, C08, and C09, and a second service area 102 includes six cells C01, C02, C03, C04, C05, and C06. The cells C05 and C06 are belonged to both of two service areas 103. For example, if it is assumed that the first MBMS is transferred to the first service area 101 and the second MBMS is transferred to the second service area 102, the cells c05 and c06 are areas receiving both of the first and second MBMSs. Therefore, equipment in the service area 103 must receive two service announcements.

If it is assumed that the third service area 104 includes five cells C10, C11, C12, C13, and C14, these cells are controlled by different UTRANs. The NodeB/RNC4 204 and the NodeB/RNC6 206 in the UTRAN must allocate the same MBMS multicast address to the service announcement service. If one of two UTRANs defines a different service area, for example, if cells C13 and C14 are defined as service areas for different services, a new IP multicast address is assigned for the third service area SA3 and the cells C13 and C14 must receive different service announcements.

If a multicast service for service announcement is assigned according to a service area as described above, equipments in a cell overlapped at two service areas receive service information from two service announcement services. That is, a cell must receive service announcements as many as the number of service areas included in a corresponding cell. However, an equipment must prepare a plurality of IP multicast session, manage and sustain the receipt of service announcement document from a plurality of multicast channels to receive service announcements. Also, the equipment must modify the setting of an IP multicast session using system information from a UTRAN in order to receive service announcement when a new service is added or an existing service is deleted.

However, it is preferable to receive information about all of available services through one multicast channel at an area like an equipment receiving a service announcement document through one broadcast channel in a method of receiving service announcement using a MBMS broadcast bearer. Therefore, it is not proper to allocate IP multicast addresses and multicast channels according to service areas for service announcement to a service area.

In order to overcome such a problem, a cell, the smallest distinguishable area in a mobile communication network, is defined as a unit area for service announcement, a MBMS multicast service for service announcement is defined by each cell, and an equipment is enabled to receive service announcement through a service announcement channel existing for a corresponding area using the defined information in the present embodiment.

Figure 3:
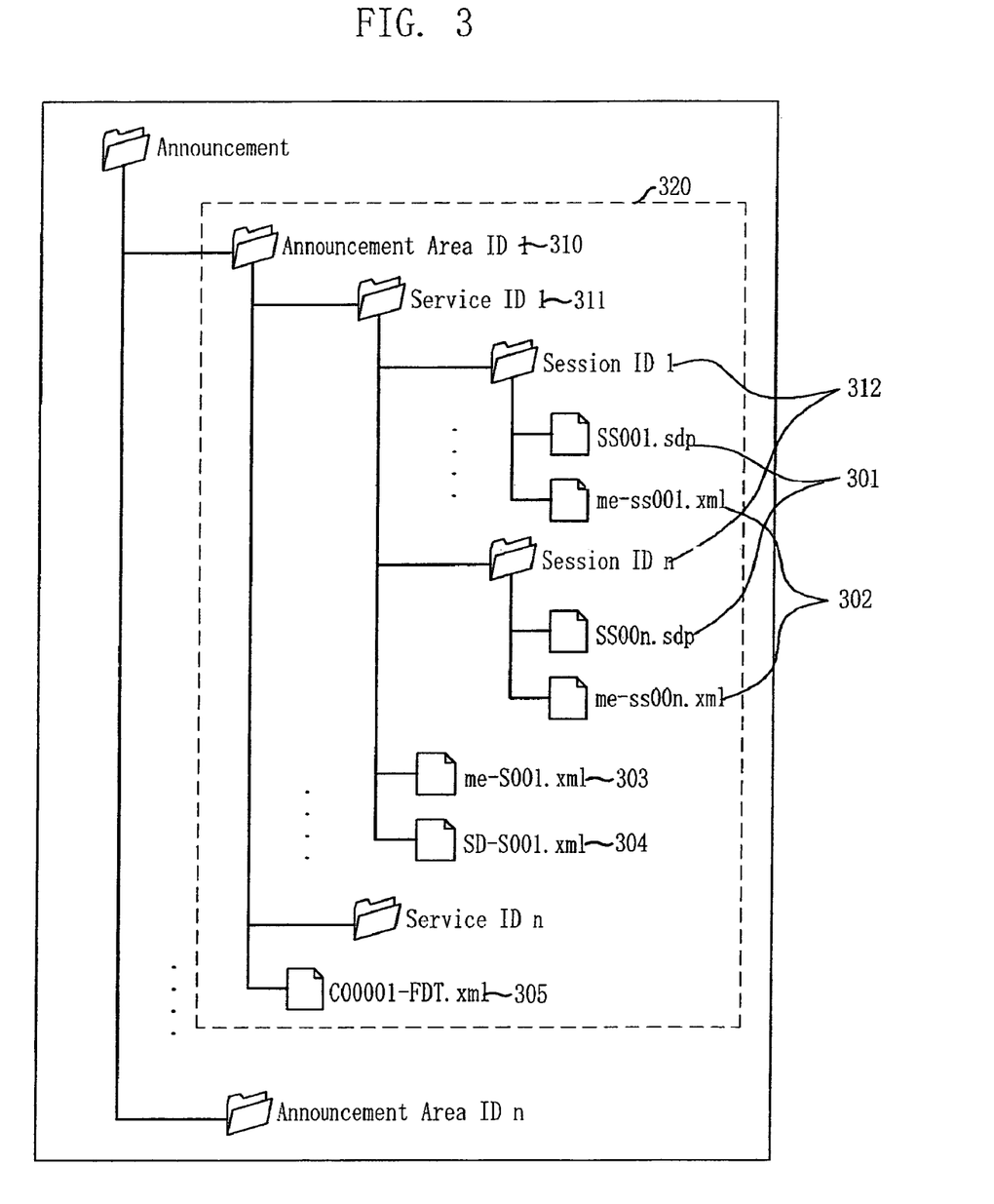
FIGS. 3 and 4 are diagrams showing a system for managing service announcement document at a MB-SC in accordance with an embodiment of the present invention.

FIG. 3 is a diagram showing a system for managing service announcement document at a MB-SC in accordance with an embodiment of the present invention.

Referring to FIG. 3, at the first step, an announcement area directory is formed according to a service announcement area by defining service announcement area IDs Announcement Area ID 1 to Announcement Area ID n as directory IDs and a service directory 311 is sustained by assigning service IDs Service ID 1 to Service ID n to announcement areas according to related services in the system for managing the service announcement document according to the present embodiment. The service directory includes session directories having session IDs Session ID1 to Session IDn as a lower directory for storing service information files for corresponding services and session information.

The service information files includes a service description (SD) file 304 for describing service definition and service information, and a metadata envelop file 303 for providing information necessary to decode the SD file, which is provided from an equipment receiving the service announcement document.

The session directory includes a session description protocol (SDP) file 301 for defining parameters for a start time or an ending time for each session and parameters for transmitting and receiving contents, and a metadata envelop file 302 (ME) for decoding the SDP file.

In the present embodiment, a service announcement area is defined as one cell. However, the directory management system according to the present embodiment can be applied although the service announcement area is defined as a set of more than two cells.

The BM-SC transmits service information about all of MBMSs available to a corresponding service announcement area and session information about sessions of a corresponding service after a MBMS multicast bearer is set for a cell. That is, all files in a directory system 320 are transmitted to equipments as a service announcement document.

At this moment, information about the number of files to transfer through one service announcement and information for parsing corresponding files are generated as an ID-FDT file 305, and the ID-FDT file 305 is transferred. The service area ID-FDT file is a file used in a FLUTE session for performing a MBMS download type MBMS. The ID-FDT file includes information about contents to be transferred to one FLUTE session.

The transferred service announcement document may be directly provided to a user through a user equipment after the service announcement document is decoded. That is, a user is enabled to confirm available services at a current location, sessions included in a corresponding service, and a time of predetermined contents available.

If various services are provided and many contents are transferred at the same time, it may be necessary to group or classify the services. Such various services can be accepted by adding a directory system between directory systems 310 and 311 as many as categories to classify. Such a classification system may be used as it is when the classification system is transferred to an equipment and a user wants to user service information.

Figure 4:
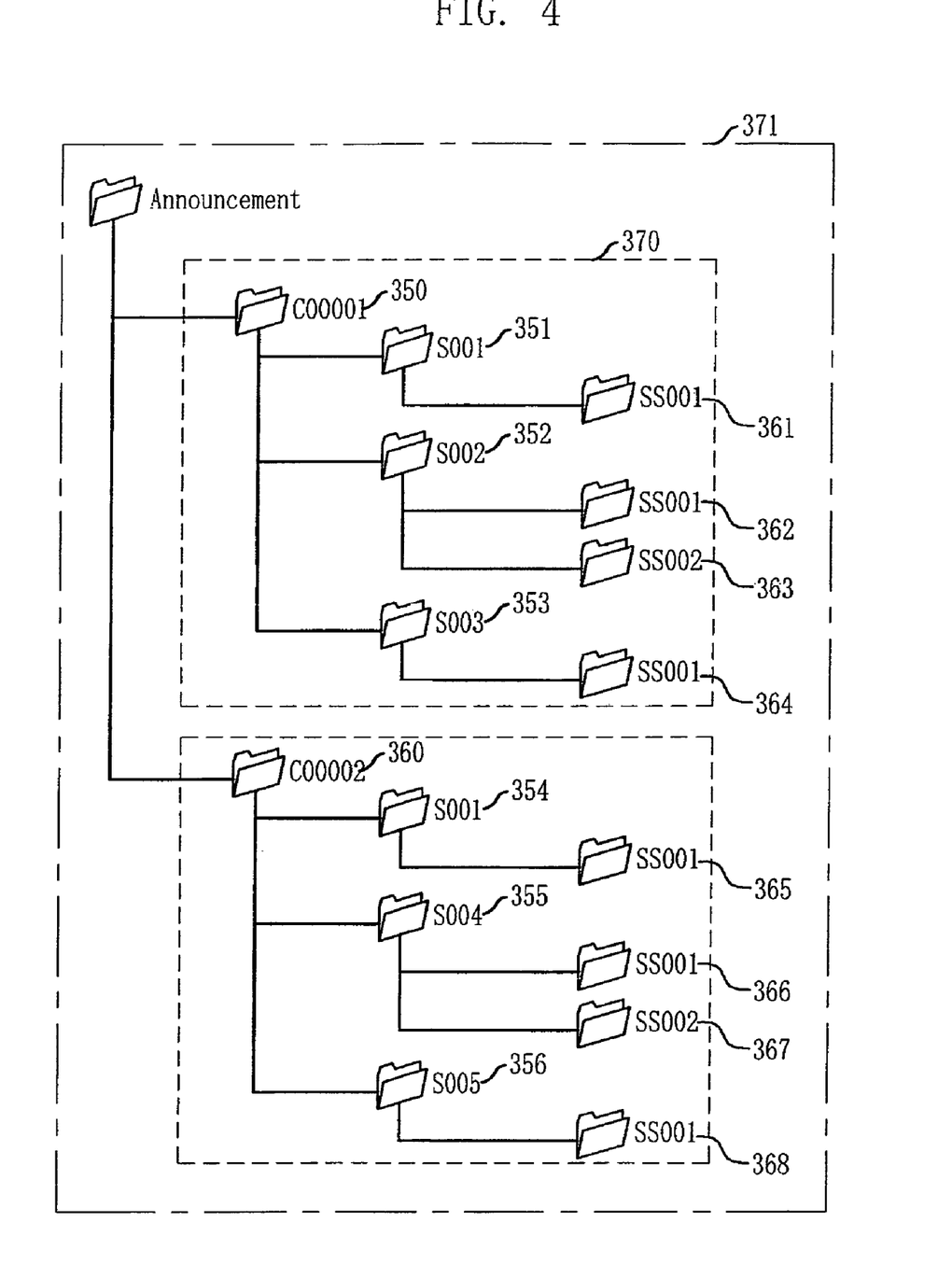

FIG. 4 is a diagram showing a system for managing service announcement document at a MB-SC in accordance with another embodiment of the present invention.

FIG. 4 shown another embodiment of the management system shown in FIG. 3. Referring to FIG. 4, directories 350 and 360 denote cells which are two service announcement areas. Also, it shows that a first service 351, a second service 352, and a third service 353 are provided to a first cell 350.

The first service 351 includes one session 361, the second service 352 includes two sessions 362 and 363, and the third service includes one session 364.

The second cell 360 is provided with the first service 354, the fourth service 355, and the fifth service 356. The first service 354 includes one session, the fourth service 355 includes two sessions, and the fifth service 356 includes one session. The first services 351 and 354 are the same service that is provided two cells.

Figure 5:
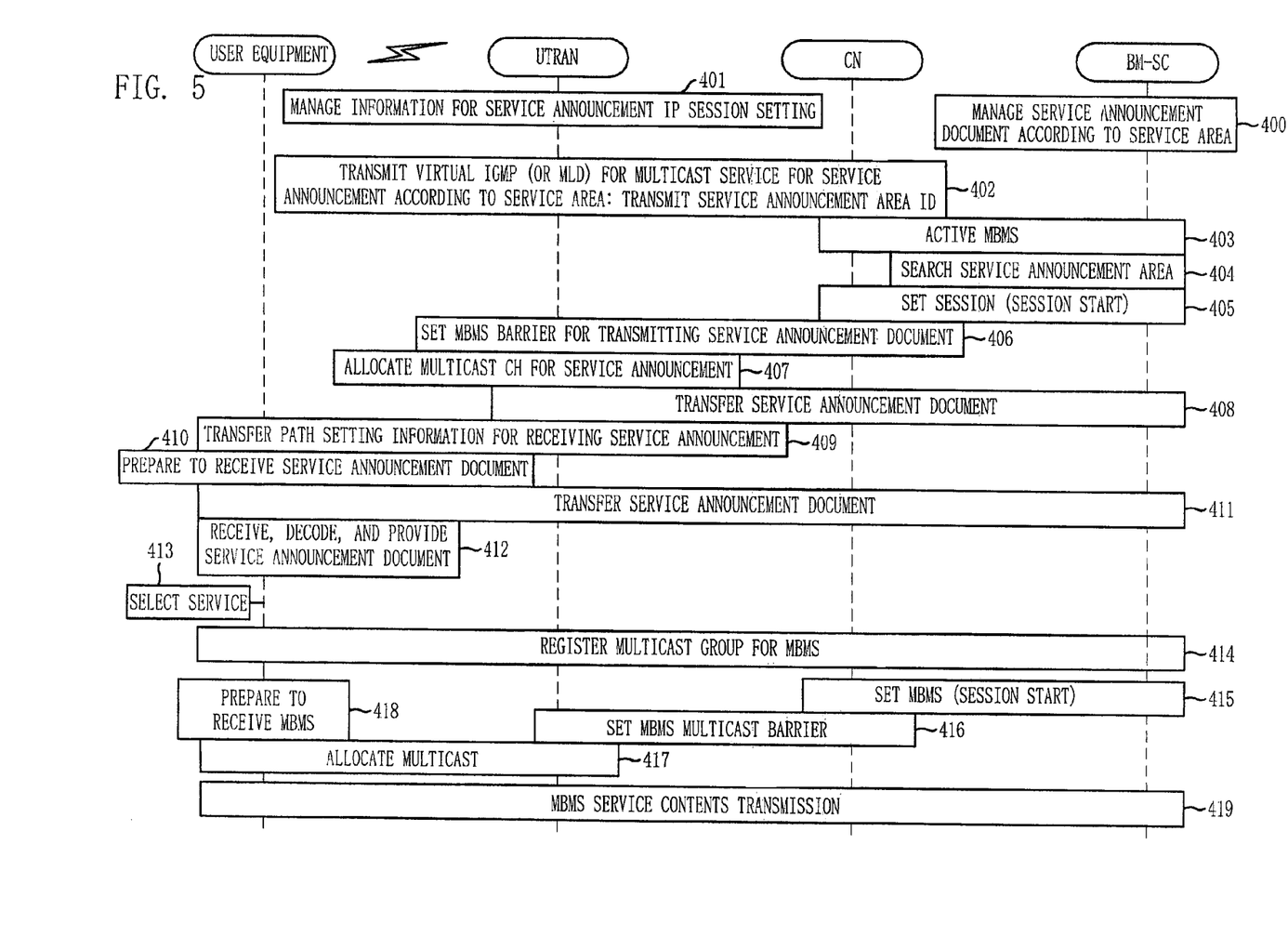
FIG. 5 is a flowchart illustrating a method for service announcement according to a service area using a MBMS multicast bearer in accordance with an embodiment of the present invention.

FIG. 5 is a flowchart illustrating a method for service announcement according to a service area using a MBMS multicast bearer in accordance with an embodiment of the present invention.

At first, the BM-SC manages a service announcement document according to a service area at step S400. At the step S400, the BM-SC stores and manages a service announcement document for a corresponding service according to the above described management system when a MBMS is registered for service announcement. Whenever a registered service is deleted or the information of a service changes, the BM-SC reflects the deleted or modified information to the previously stored service announcement document. Particularly, the BM-SC sustains a directory system shown in FIG. 3 or FIG. 4 for managing service announcement document according to a service announcement area in order to perform service announcement distinguished according to a service area.

Meanwhile, the UTRAN sets an IP session for service announcement at step S401. At the step S401, the UTRAN manages how service announcement areas are set as a configuration file, and stores and manages MBMS multicast service information for service announcement according to corresponding service announcement area. After a radio channel for service announcement is allocated, the mapping relation between two information is managed and sustained.

Then, the UTRAN transmits a virtual IGMP or MLD for a service announcement multicast service and transmits a service announcement area ID at step S402.

At the step S402, the UTRAN performs the same process of an equipment for transmitting an IGMP or an MLD for a corresponding service by searching service announcement information of each service announcement area when a system starts normally operating, thereby transmitting the IGMP or the MLD to a CN with a corresponding service announcement area ID. That is, the UTRAN enables a service activation procedure for a multicast service for service announcement to be started instead of a user equipment. For this, an additional message may be used between the UTRAN and the CN. In order to avoid the CN to be modified additionally, the UTRAN may generate a packet that is appeared as an IGMP or a MLD packet and transmit the packet to the CN as if an user equipment transmits the IGMP or the MLD packet to the CN. The UTRAN enables a CN to recognize a service announcement area that generates a service activation request by transmitting a service announcement area ID with the virtual IGMP or the virtual MLD packet. The GGSN transfers it to the BM-SC during MBMS multicast activation procedure.

Then, a MBMS is activated at step S403. Through the MBMS activation step S403, a multicast tree is formed of the RNC, the SGSN, the GGSN, and the BM-SC.

Then, the BM-SC searches a service announcement area at step S404. At the step S404, the BM-SC searches a service announcement area that transmits a service announcement request using an IP multicast address assigned by the IGMP or the MLD transferred from the CN while the MBMS multicast activation step is performing.

Then, the BM-SC performs sets a session at step S405. At the step S405, the BM-SC sets a MBMS multicast bearer for service announcement to a corresponding service announcement area.

Then, a MBMS bearer is set for transferring service announcement document at step S406. At the step S406, a MBMS multicast bearer is set through the core network of a mobile communication network and the UTRAN according to a session setting procedure started from the BM-SC.

At step S407, the UTRAN sets a radio multicast channel to transfer the service announcement document for a corresponding cell. At step S408, the BM-SC transfers the corresponding service announcement document.

Then, a user equipment enters a control area of the UTRAN and receives multicast service information for service announcement through system information transmitted from the UTRAN. Then, the user equipment receives path setting information by setting a multicast channel and a download packet receiving path in order to receive service announcement packets at step S409, thereby preparing to receive service announcement document at step S410. Then, the service announcement document is transferred from the BM-SC to the user equipment at step S411. As described above, the user equipment entering a corresponding area receives the same service information through one multicast channel for service announcement.

Then, the user equipment decodes the service announcement document and provides an available service list to a user at step S412. Herein, the user equipment may provide supplementary information to a user by analyzing information about services, sessions, and contents, which are received through the service announcement.

If a user inputs information of selecting a predetermined service based on the provided service information at step S413, a multicast group registering operation for a MBMS user service is performed at step S414. At the step S414, a MBMS activation procedure for a corresponding service is performed, it is registered to a multicast group of a corresponding MBMS multicast service, and a path of transferring a multicast packet is set.

After performing the step S414, a corresponding user equipment is in a state of reserving to transfer contents at a time of starting a selected MBMS. When the selected MBMS starts, the BM-SC perform a MBMS session selection procedure for setting a corresponding service session at step S415.

At step S416, a MBMS multicast bearer setting procedure is performed by the interaction between the core network CN of a mobile communication network and the UTRAN. At step S417, a multicast channel setting process is performed between the UTRAN and the user equipment.

During the steps S415, S416, and S417, the user equipment prepares to receive a MBMS user service by performing an internal process for receiving the selected service and waiting for receiving data packets using the received service announcement document at step S418.

At step S419, the MBMS contents transmitted from the BM-SC are transferred to the user equipment through the allocated MBMS bearer and the multicast channel.

In order to provide a MBMS in a mobile communication network, a user equipment must be informed of available services according to a predetermined area. For this, a MBMS frame work includes a service announcement function to enable the BM-SC to inform equipments of available services according to a current location.

In order to perform such a service announcement function, various methods were introduced. However, it is effective to use a MBMS broadcast/multicast bearer for service announcement in a view of using resources because the same information is transferred to all of equipments in the same area. However, all of available services to all of areas are provided if the MBMS broadcast bearer is used.

Since a MBMS includes a service area to provide a corresponding service, an equipment must be in a corresponding service area to receive a corresponding service. Therefore, it is effective to announce available services only according to areas.

Therefore, in the method and system for service announcement according to the present invention, a MBMS multicast channel for service announcement is allocated to a service announcement unit area using a MBMS multicast bearer, and the BM-SC manages the service announcement document according to a service area. Also, the UTRAN transmits a virtual IGMP or MLD in order to enable the CN to perform a corresponding multicast service activation procedure like the CN receiving an IGMP or MLD from an equipment for setting a MBMS multicast bearer to transfer service announcement.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

The invention claimed is:

1. A method for a multimedia broadcast/multicast service (MBMS) announcement to provide a service announcement document in a broadcast multicast service center (BM-SC) of a MBMS system, comprising the steps of:
    generating a service announcement document;
    searching a service announcement area;
    setting a session for providing the service announcement document to the searched service area by setting a MBMS multicast bearer;
    transmitting a corresponding service announcement document to the service announcement area,
    wherein the service announcement document includes an announcement area directories according to service announcement areas, and
    the announcement area directory includes service directories according to services provided to corresponding service announcement areas as a lower directory.

2. The method of claim 1, wherein the service directory includes a session directory for storing session information forming a corresponding service as a lower directory.

3. The method of claim 1, wherein the service directory includes:
    a service description file for describing information about a corresponding service; and
    a metadata file for describing information for decoding the service description file.

4. The method of claim 2, wherein the session directory includes;
    a session description file for describing information about a corresponding session and contents transferred through the corresponding session; and
    a metadata file for describing information for decoding the session description file.

5. The method of claim 1, wherein the announcement area director includes the number of files to be transferred through one service announcement and information for parsing a corresponding file.

6. The method of claim 1, wherein the service announcement document generating step includes the steps of:
    storing and managing the service announcement document according to the service announcement unit area; and
    updating the service announcement document by the service announcement unit area.

7. The method of claim 1, wherein the service announcement area is a unit of more than one cells.

8. The method of claim 1, wherein in the announcement area directory, a service announcement area ID is used as a directory ID.

9. A method for multimedia broadcast/multicast service (MBMS) announcement in order to provide service announcement document in a universal mobile telecommunications network terrestrial radio access network (UTRAN) of a MBMS system, comprising the steps of:
- managing IP session information for a MBMS announcement;
- transmitting a virtual Internet group management protocol (IGMP) or a virtual multicast listener discovery (MLD) for a multicast service of a service announcement area for a MBMS;
- setting a MBMS bearer for transferring service announcement document to the service announcement area;
- setting a radio multicast channel for a cell corresponding to the service announcement area; and
- transmitting the service announcement document received from a BM-SC to user equipments in the cell with the radio multicast channel set,
- wherein the service announcement document includes an announcement area directory according to a service announcement area, and
- the announcement area directory includes a service directory according to a service provided to a corresponding announcement area as a lower directory.

10. The method of claim 9, wherein the service directory includes a session directory for storing session information forming a corresponding service as a lower directory.

11. The method of claim 9, wherein the announcement area directory includes the number of files to be transmitted through one service announcement and a file describing information for parsing a corresponding file.

12. The method of claim 9, wherein the virtual IGMP transmission step includes the step of transmitting a service announcement area ID for a service announcement area to announce the MBMS.

13. The method of claim 9, wherein the service announcement area is a unit of more than one cells.

14. The method of claim 9, wherein the announcement area directory uses a service announcement area ID as a directory ID.

15. A system for multimedia broadcast/multicast service (MBMS) service announcement using a MBMS multicast bearer comprising:
- a broadcast multimedia service control node (BM-SC); and
- a radio access network control node,
- wherein the BM-SC includes:
- a means for generating a service announcement document including announcement area directories according to service announcement areas and service directories according to services to be provided to a corresponding service area as a lower directory of the announcement area directories and managing the generated service announcement document, and
- wherein the radio access network control node includes:
- a mean for transferring the service announcement document to the user equipment located at the service announcement area.

16. The system of claim 15, wherein the BM-SC further includes a means for allocating one MBMS multicast service for service announcement to a unit area for service announcement, and storing and managing a mapping relation between a service announcement area and the MBMS multicast service allocated to a corresponding area.

17. The system of claim 15, wherein the BM-SC further includes a means for generating a service announcement document having information about a corresponding service and information about sessions of a corresponding service according to a service announcement unit area when a new MBMS is registered.

18. The system of claim 15, wherein the BM-SC stores and manages the service announcement document according to the service announcement unit area.

19. The system of claim 15, wherein the BM-SC performs a process of activating a MBMS multicast service for service announcement and performs a session setting procedure for setting a MBMS multicast bearer for transferring a service announcement document to a corresponding service announcement area.

20. The system of claim 15, wherein the radio access network management node stores and manages information for service announcement including an announcement area ID, a multicast address, a port, and a radio channel ID according to a service announcement area in an own control area.

21. The system of claim 15, wherein the radio access network control node transfers FLUTE session setting information and radio channel setting information to a user equipment in an own control area in order to enable the user equipment to prepare the reception of a service announcement document.

22. The system of claim 15, wherein the radio access network control node allocates a multicast radio channel according to an allocated MBMS multicast service for service announcement.

23. The system of claim 15, wherein the radio access network control node triggers a core network to start a MBMS multicast activation procedure like that a user equipment in a corresponding area transmits an IGMP or a MDL to a core network according to a service announcement area applied to an own control area after a system operates.

24. The system of claim 15, wherein the radio access network control node requests MBMS multicast activation for service announcement by transmitting a service announcement area ID where a corresponding service announcement is applied to.

* * * * *